US012637026B1

(12) United States Patent (10) Patent No.: US 12,637,026 B1

Forero Rueda et al. (45) Date of Patent: May 26, 2026

(54) VEHICLE AIRBAG SYSTEM WITH VARIABLE DEPLOYMENT

(71) Applicant: GM GLOBAL TECHNOLOGY OPERATIONS LLC, Detroit, MI (US)

(72) Inventors: Manuel Forero Rueda, Royal Oak, MI (US); Chin-Hsu Lin, Troy, MI (US); Mitesh Lalwala, Sterling Heights, MI (US); Ryan Aaron Gellner, Livonia, MI (US); Nick Hoffman, Swartz Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/022,052

(22) Filed: Jan. 15, 2025

(51) Int. Cl.
B60R 21/231 (2011.01)
B60R 21/207 (2006.01)
(Continued)

(52) U.S. Cl.
CPC ........ B60R 21/2338 (2013.01); B60R 21/207 (2013.01); B60R 21/231 (2013.01);
(Continued)

(58) Field of Classification Search
CPC ........... B60R 2021/23153; B60R 2021/23382; B60R 2021/161; B60R 21/231;
(Continued)

(56) References Cited

U.S. PATENT DOCUMENTS 6,113,134 A * 9/2000 Lim ........................ B60R 21/26
180/282
6,308,983 B1 * 10/2001 Sinnhuber ......... B60R 21/01504
280/743.1
(Continued)

FOREIGN PATENT DOCUMENTS

CN 101898540 A * 12/2010 ......... B60R 21/2338
KR 20040046764 A * 6/2004 ............. B60R 21/26
(Continued)

OTHER PUBLICATIONS

German Office Action for German Application No. 102025109057.2; dated Jul. 28, 2025; 5 pages.

*Primary Examiner* — Keith J Frisby
(74) *Attorney, Agent, or Firm* — CANTOR COLBURN LLP

(57) ABSTRACT

A safety system for an occupant of a vehicle includes an airbag selectably inflatable by an inflator operably connected to the airbag, one or more deployment mechanisms operably connected to the airbag to control deployment of the airbag, and a controller operably connected to the one or more deployment mechanisms. The controller is configured to modify operation of the one or more deployment mechanisms as a result of detecting one or more characteristics of the occupant. A method of operating a safety system for vehicle occupant includes detecting one or more characteristics of an occupant of a seat of the vehicle, adjusting one or more deployment mechanisms of the safety system as a result of the one or more characteristics, and deploying an airbag operably connected to the one or more deployment mechanisms. Adjustment of the one or more deployment mechanisms modifies deployment of the airbag.

4 Claims, 7 Drawing Sheets

(51) Int. Cl.
B60R 21/233 (2006.01)
B60R 21/2338 (2011.01)
*B60R 21/01* (2006.01)
*B60R 21/16* (2006.01)

(52) U.S. Cl.
CPC .. B60R 21/233 (2013.01); *B60R 2021/01238*
(2013.01); *B60R 2021/161* (2013.01); *B60R 2021/23153* (2013.01); *B60R 2021/23382*
(2013.01)

(58) Field of Classification Search
CPC .......... B60R 21/23184; B60R 21/2338; B60R 21/207; B60R 2021/01238; B60R 21/2334
USPC ............ 280/743.2, 743.1, 730.1, 735, 728.1; 701/45
See application file for complete search history.

(56) References Cited

U.S. PATENT DOCUMENTS

| | | | |
|---|---|---|---|
| 10,525,922 B1 * | 1/2020 | Lin | B60R 21/2338 |
| 11,713,014 B1 | 8/2023 | Faruque et al. | |
| 12,012,063 B1 | 6/2024 | Jaradi et al. | |
| 2006/0186656 A1 * | 8/2006 | Kumagai | B60R 21/231 |
| | | | 280/743.1 |
| 2019/0241148 A1 * | 8/2019 | Shin | B60R 21/2338 |
| 2021/0053526 A1 * | 2/2021 | Sapountzis | B60R 21/203 |
| 2022/0388466 A1 * | 12/2022 | Jaradi | B60R 21/01538 |

FOREIGN PATENT DOCUMENTS

| | | | | |
|---|---|---|---|---|
| KR | 20060021448 A * | 3/2006 | .......... | B60R 21/231 |
| KR | 20060098606 A * | 9/2006 | ......... | B60R 21/2338 |

* cited by examiner

VEHICLE AIRBAG SYSTEM WITH VARIABLE DEPLOYMENT

The subject disclosure relates to vehicles, and in particular to inflatable passenger safety systems, or airbag systems, of vehicles.

Vehicles utilize various safety systems to protect occupants in front seats of vehicles, as well as occupants in rear seats of vehicles, in the event of a crash. Current state of the art seat belts utilized in rear seats function to limit excursion of the pelvis and upper torso of the occupant while the head of the occupant may continue to move forward during, for example, a frontal impact. Load limiting features of the seat belts are currently utilized to balance energy management and the forward excursion. To improve performance of rear seat safety systems, occupants of various sizes and in various seating positions, such as children in forward-facing and rear-facing child seats, should be considered.

SUMMARY

In one exemplary embodiment, a safety system for an occupant of a vehicle includes an airbag selectably inflatable by an inflator operably connected to the airbag, one or more deployment mechanisms operably connected to the airbag to control deployment of the airbag, and a controller operably connected to the one or more deployment mechanisms. The controller is configured to modify operation of the one or more deployment mechanisms as a result of detecting one or more characteristics of the occupant.

In addition to one or more of the features described herein, the one or more deployment mechanisms includes one or more tethers having an adjustable tether length. Adjusting the tether length modifies one or more of the shape, size or position of the airbag upon inflation of the airbag.

In addition to one or more of the features described herein, the airbag includes two or more airbag chambers, and a tether of the one or more tethers is configured to control airflow between a first chamber of the two or more chambers and a second chamber of the two or more chambers.

In addition to one or more of the features described herein, the airbag is toroidal in shape.

In addition to one or more of the features described herein, the one or more deployment mechanisms are movable to modify a direction of deployment of the airbag.

In addition to one or more of the features described herein, the one or more deployment mechanisms control an inflation pressure of the airbag thereby modifying a deployed position of the airbag.

In addition to one or more of the features described herein, the airbag is deployed from one of a seat back, a floor, a roof, a side pillar or a center console of the vehicle.

In another exemplary embodiment, a vehicle includes a vehicle body defining an occupant compartment, one or more rows of seats positioned in the occupant compartment, and a safety system for an occupant of a seat of the vehicle. The safety system includes an airbag selectably inflatable by an inflator operably connected to the airbag, one or more deployment mechanisms operably connected to the airbag to control deployment of the airbag, and a controller operably connected to the one or more deployment mechanisms. The controller is configured to modify operation of the one or more deployment mechanisms as a result of detecting one or more characteristics of the occupant.

In addition to one or more of the features described herein, the one or more deployment mechanisms includes one or more tethers having an adjustable tether length. Adjusting the tether length modifies one or more of the shape, size or position of the airbag upon inflation of the airbag.

In addition to one or more of the features described herein, the airbag includes two or more airbag chambers, and a tether of the one or more tethers is configured to control airflow between a first chamber of the two or more chambers and a second chamber of the two or more chambers.

In addition to one or more of the features described herein, the airbag is toroidal in shape.

In addition to one or more of the features described herein, the one or more deployment mechanisms are movable to modify a direction of deployment of the airbag.

In addition to one or more of the features described herein, the one or more deployment mechanisms control an inflation pressure of the airbag thereby modifying a deployed position of the airbag.

In addition to one or more of the features described herein, the occupant is positioned in a second seat row behind a first seat row of the vehicle.

In addition to one or more of the features described herein, the airbag is deployed from one of a seat back of the first seat row, a floor, a roof, a side pillar or a center console of the vehicle.

In yet another exemplary embodiment, a method of operating a safety system for an occupant of a vehicle includes detecting one or more characteristics of an occupant of a seat of the vehicle, adjusting one or more deployment mechanisms of the safety system as a result of the one or more characteristics, and deploying an air bag operably connected to the one or more deployment mechanisms. Adjustment of the one or more deployment mechanisms modifies deployment of the air bag.

In addition to one or more of the features described herein, the one or more deployment mechanisms includes one or more tethers having an adjustable tether length, and adjusting the tether length modifies one or more of the shape, size or position of the airbag upon inflation of the airbag.

In addition to one or more of the features described herein, the airbag includes two or more airbag chambers, and a tether of the one or more tethers is configured to control airflow between a first chamber of the two or more chambers and a second chamber of the two or more chambers.

In addition to one or more of the features described herein, the airbag is toroidal in shape.

In addition to one or more of the features described herein, the one or more deployment mechanisms are movable to modify a direction of deployment of the airbag.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
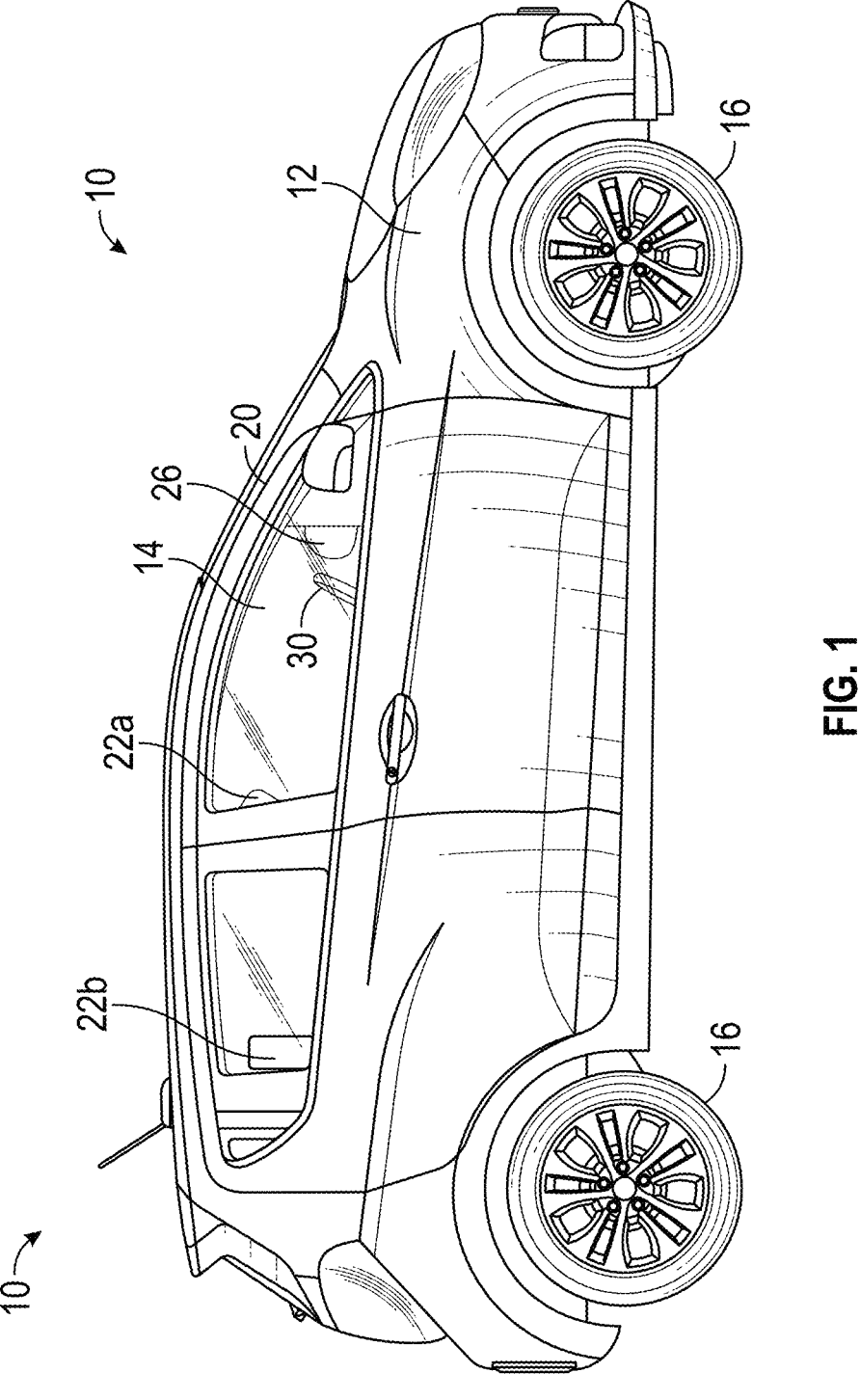
FIG. 1 is a side view of an exemplary embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment a vehicle, in accordance with a non-limiting example, is indicated generally at 10 in FIG. 1. Vehicle 10 includes a body 12 supported on a plurality of wheels 16. In a non-limiting example, two of the plurality of wheels 16 are steerable. Body 12 defines, in part, an occupant compartment 14 having seats 22a and 22b (referred to also as 22) positioned behind a dashboard 26. A steering control 30 is arranged between seats 22 and dashboard 26. Steering control 30 is operated to control orientation of the steerable wheel(s) 16. The seats 22 include a front occupant seat 22a and at least one rear occupant seat 22b. While the vehicle 10 shown herein includes two rows of seats 22, one skilled in the art will readily appreciate that the present disclosure may be readily applied to vehicles having three or more rows of seats 22.

Figure 2:
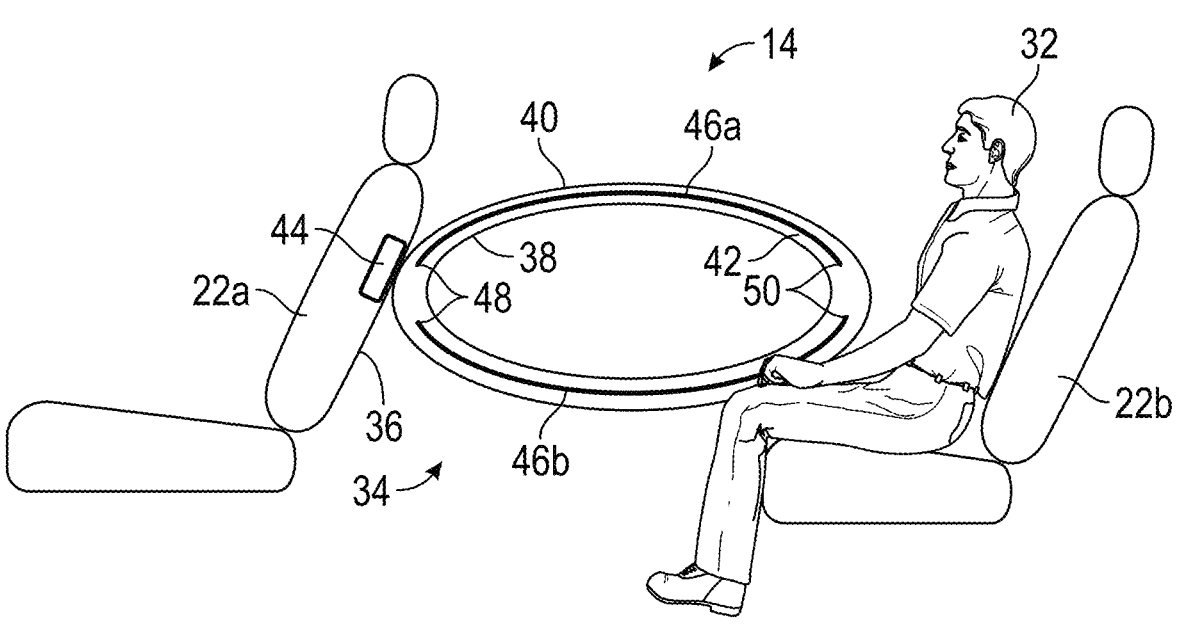
FIG. 2 is a schematic illustration of an embodiment of an occupant compartment of a vehicle.

Illustrated in FIG. 2 is an exemplary occupant compartment 14 having a front occupant seat 22a and a rear occupant seat 22b. A passenger 32 is seated in the rear occupant seat 22b. Also illustrated is a rear passenger airbag 34 shown in a deployed position, with the rear passenger airbag 34 deployed from a seat back 36 of the front occupant seat 22a. When deployed as illustrated, the rear passenger airbag 34 extends from the seat back 36 toward the passenger 32 seated in the rear occupant seat 22b. The rear passenger airbag 34 is tubular or toroidal in shape, having an inner wall 38 and an outer wall 40 surrounding and spaced apart from the inner wall 38. The inner wall 38 and the outer wall 40 together define one or more airbag cavities 42 therebetween. The inner wall 38 and the outer wall 40 are joined by, for example, stitching to define the desired rear passenger airbag 34 shape. When the rear passenger airbag 34 is deployed, the one or more airbag cavities 42 are at least partially inflated with airflow from an inflator 44 operably connected thereto.

Figure 3:
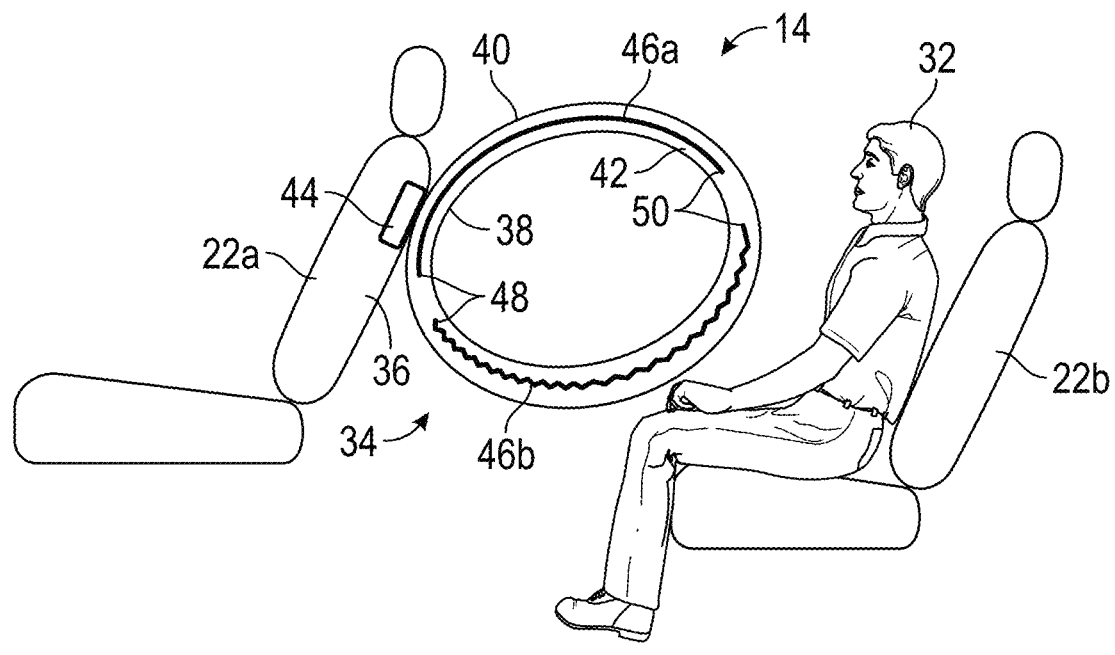
FIG. 3 is another schematic illustration of an embodiment of an occupant compartment of a vehicle.

One or more adjustable tethers 46a and 46b, also referred to herein as "46" are connected to the rear passenger airbag 34. The tethers 46 may be connected to the rear passenger airbag 34 at a first tether end 48 and a second tether end 50 opposite the first tether end 48. The first tether end 48 and the second tether end 50 define a tether length therebetween. The tether length is adjustable by, for example, moving the second tether end 50 closer to or further away from the first tether end 48. Adjusting the tether length of the one or more tethers 46 changes one or more deployment characteristics of the rear passenger airbag 34. For example, FIG. 2 illustrates a deployment of the rear passenger airbag 34 in which a first tether 46a and a second tether 46b have equal lengths. For some rear passenger 32 seating positions, such as when the rear passenger 32 is seated closer to the seat back 36 of front seat 22a, however, such as shown in FIG. 3, it is desired to alter deployment of the rear passenger airbag 34 by, for example shortening of the tether length of the first tether 46a relative to the tether length of the second tether 46b. This has the effect of modifying the shape and location of the rear passenger airbag 34 at deployment to a higher position than illustrated in FIG. 2.

Figure 4:
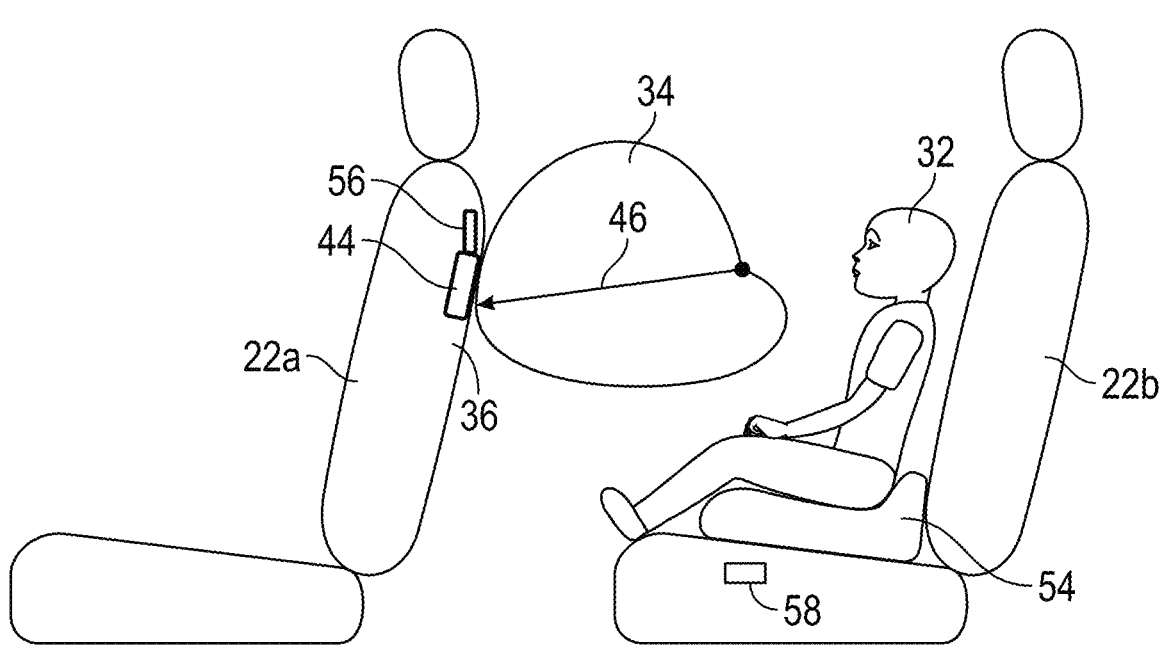
FIG. 4. is a schematic illustration of another embodiment of an occupant compartment of a vehicle.
Figure 5:
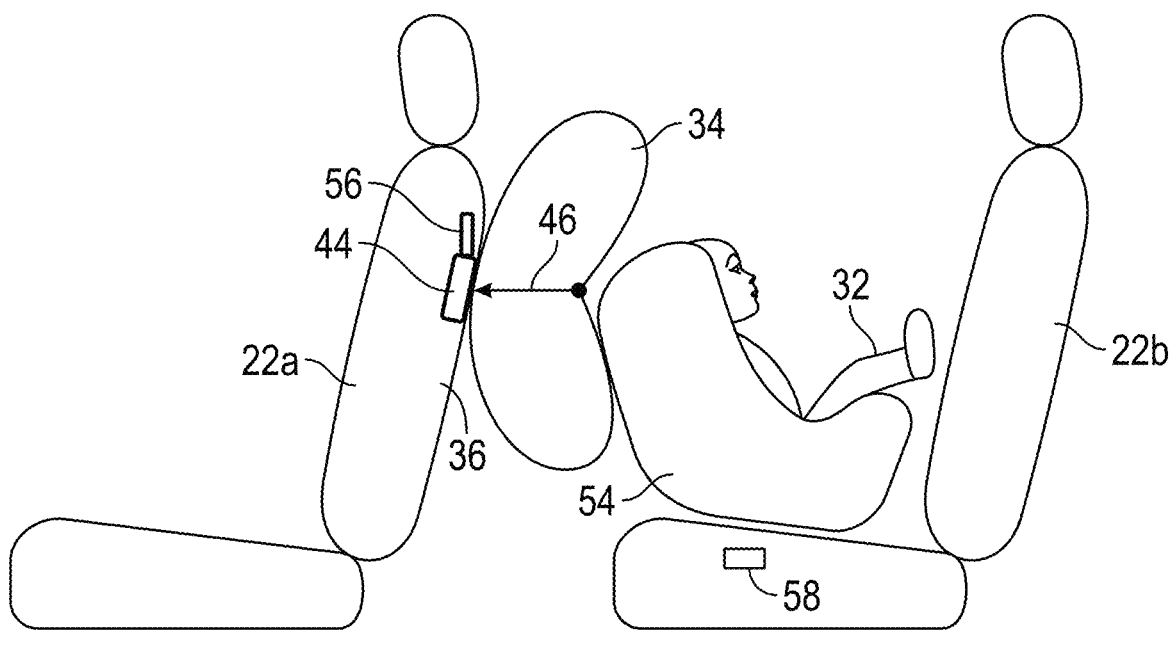
FIG. 5 is another schematic illustration of another embodiment of an occupant compartment of a vehicle.

In other embodiments, the tethers 46 may be utilized in other ways to modify or control deployment of the rear passenger airbag 34. For example, as illustrated in FIG. 4, one or more tethers 46 may be used to shape the rear passenger airbag 34 at deployment. The tether 46 may be lengthened when a child in a forward facing child seat 54 is in the rear occupant seat 22b, while the tether 46 is shortened in the illustration of FIG. 5 when a child in a rear-facing child seat 54 occupies the rear occupant seat 22b, resulting in a vertically elongated rear passenger airbag 34 shape. The rear passenger airbag 34 and the one or more tethers 46 are connected to a controller 56 to select and control a proper length of the tethers 46 depending on, for example, a size and position of the passenger 32. Passenger information may come from in-vehicle sensors 58 that, in some embodiments are embedded in the rear occupant seat 22b and/or located in other locations of the occupant compartment 14. Once the passenger size and/or position is detected, the controller 56 commands operation of the one or more tethers 46, adjusting their length as needed depending on the passenger size and position.

Figure 6:
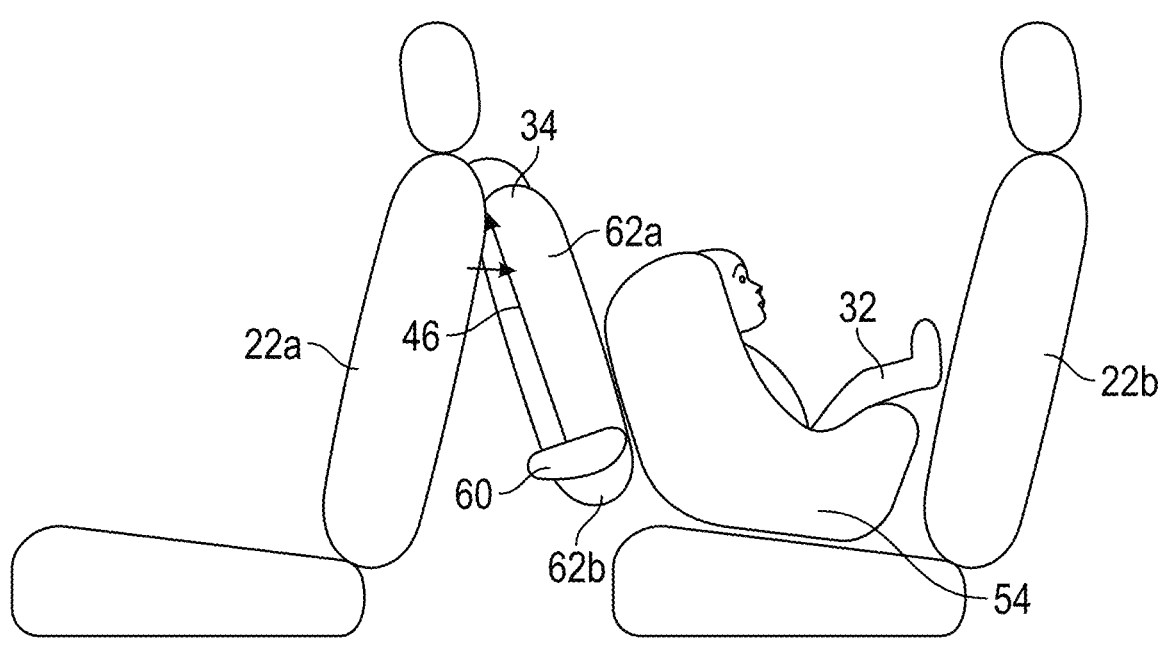
FIG. 6 is a schematic illustration of yet another embodiment of an occupant compartment of a vehicle.

Another embodiment is illustrated in FIG. 6. In this embodiment, a tether 46 is located inside the rear passenger airbag 34 and controls a valve or vent 60 between a first chamber 62a and a second chamber 62b of the rear passenger airbag 34. For example, in the case of a child occupant in a rear-facing child seat 54, the tether 46 is shortened to hold the vent 60 in a closed position, increasing inflation and thus stiffness of the first chamber 62a, while reducing inflation of the second chamber 62b.

Figure 7:
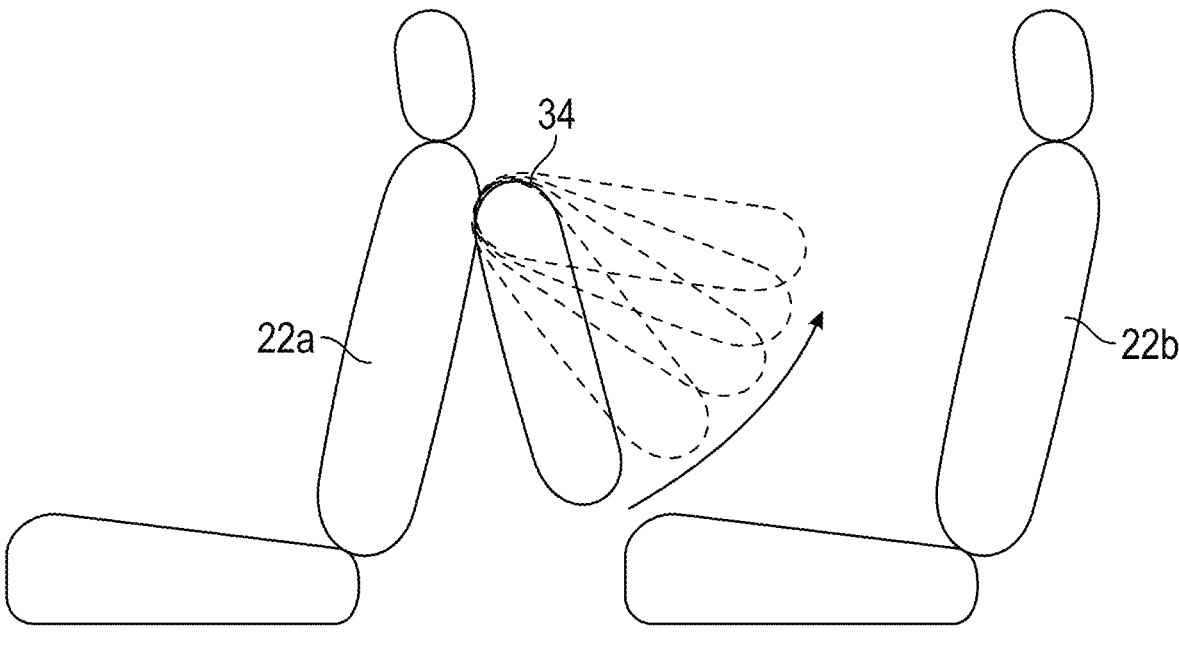
FIG. 7 is a schematic illustration of still another embodiment of an occupant compartment of a vehicle.

Referring now to FIG. 7, in other embodiments other mechanisms are used to control or modify inflation of the rear passenger airbag 34. In this embodiment, the rear passenger airbag 34 is hinge-mounted on the seat back 36 of the front seat 22a. The rear passenger airbag 34 is folded and deployment pressures are calibrated such that the rear passenger airbag 34 sweeps through a range of deployed positions depending on the inflation pressure. Depending on passenger size and position, the controller 56 (such as illustrated in FIG. 4) commands inflation to a pressure corresponding to the detected passenger size and position, with the inflated rear passenger airbag 34 reaching a selected position when inflated. Although not illustrated in FIG. 7, tethers 46 may be utilized in combination with the control of inflation pressure to accommodate different passenger sizes and positions.

Figure 8:
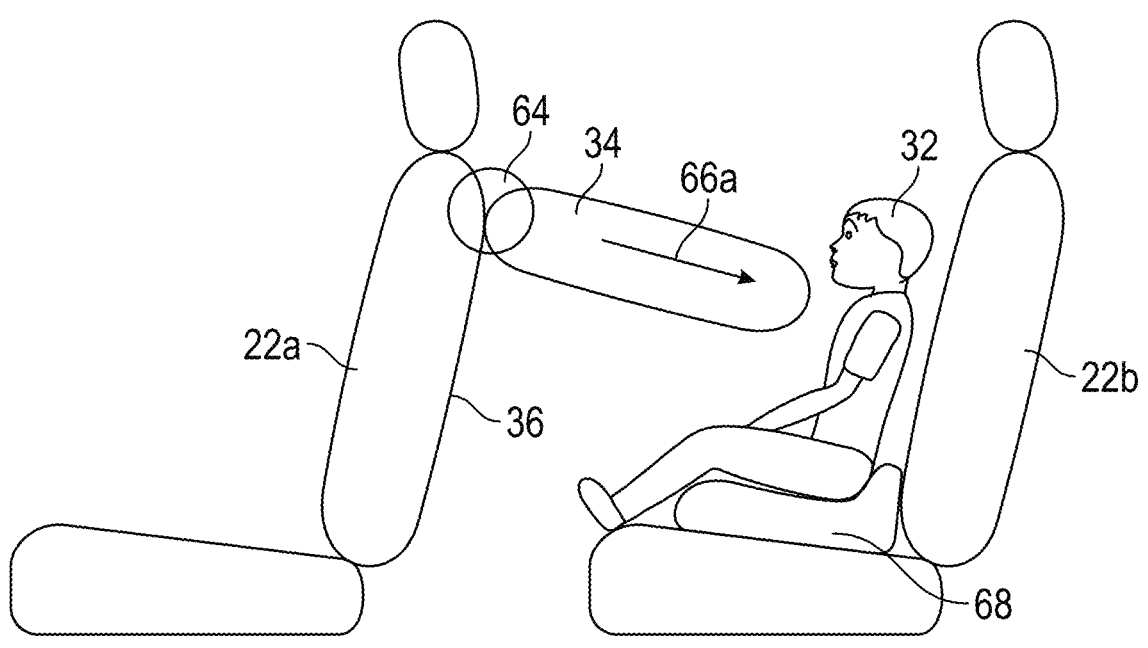
FIG. 8 is a schematic illustration of another embodiment of an occupant compartment of a vehicle.
Figure 9:
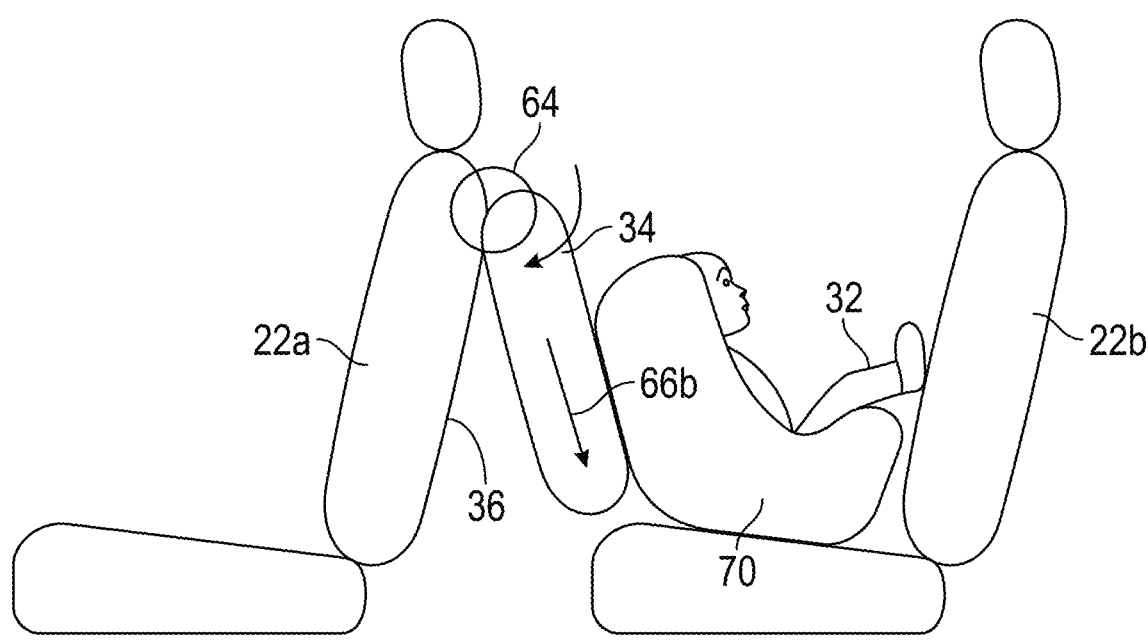
FIG. 9 is another schematic illustration of another embodiment of an occupant compartment of a vehicle.

In other embodiments, referring now to FIG. 8, the rear passenger airbag 34 includes a movable or rotatable deployment mechanism 64, that is operable by the controller 56 to change a deployment direction 66 of the rear passenger airbag 34 depending on the rear passenger detected. For example, the deployment mechanism 64 may deploy the rear passenger airbag 34 in a first deployment direction 66*a*, as shown in FIG. 8, if a first rear seat passenger, such as a child in a booster seat 68 is detected. Alternatively, if as shown in FIG. 9 a child in a rear-facing seat 70 is detected, the deployment mechanism 64 is moved or rotated to deploy the rear passenger airbag 34 in a second deployment direction 66*b*, between the seat back 36 of the front seat 22*a* and the rear-facing seat 70.

Figure 10:
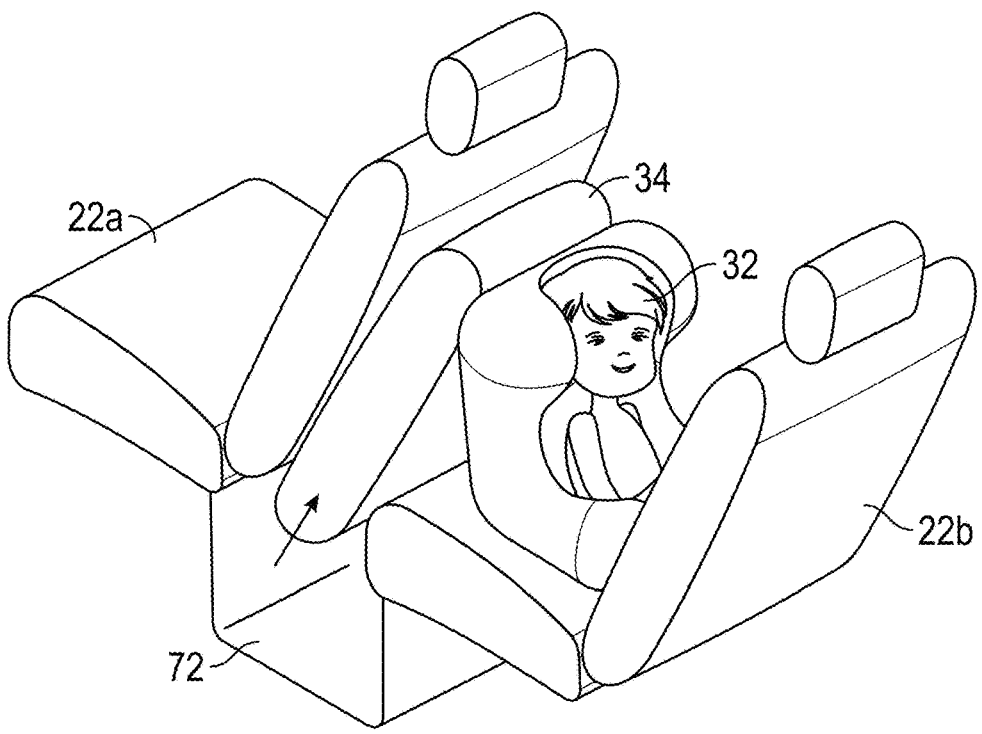
FIG. 10 is a schematic illustration of yet another embodiment of an occupant compartment of a vehicle.
Figure 11:
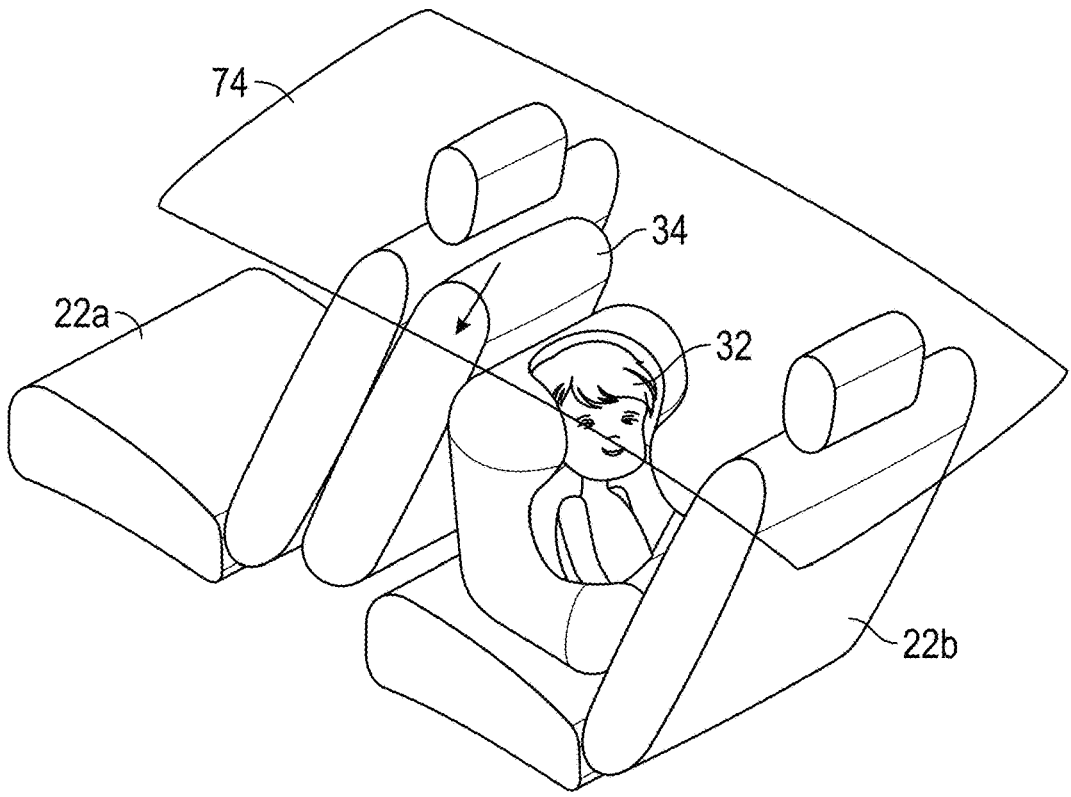
FIG. 11 is a schematic illustration of still another embodiment of an occupant compartment of a vehicle.
Figure 12:
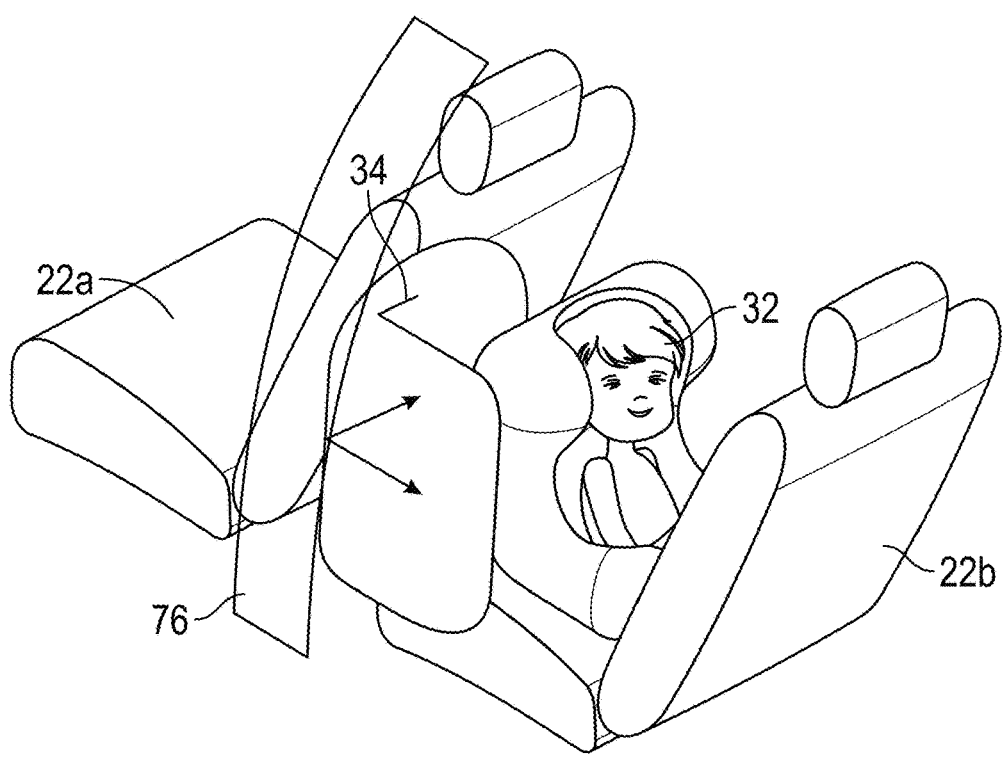
FIG. 12 is a schematic illustration of another embodiment of an occupant compartment of a vehicle.
Figure 13:
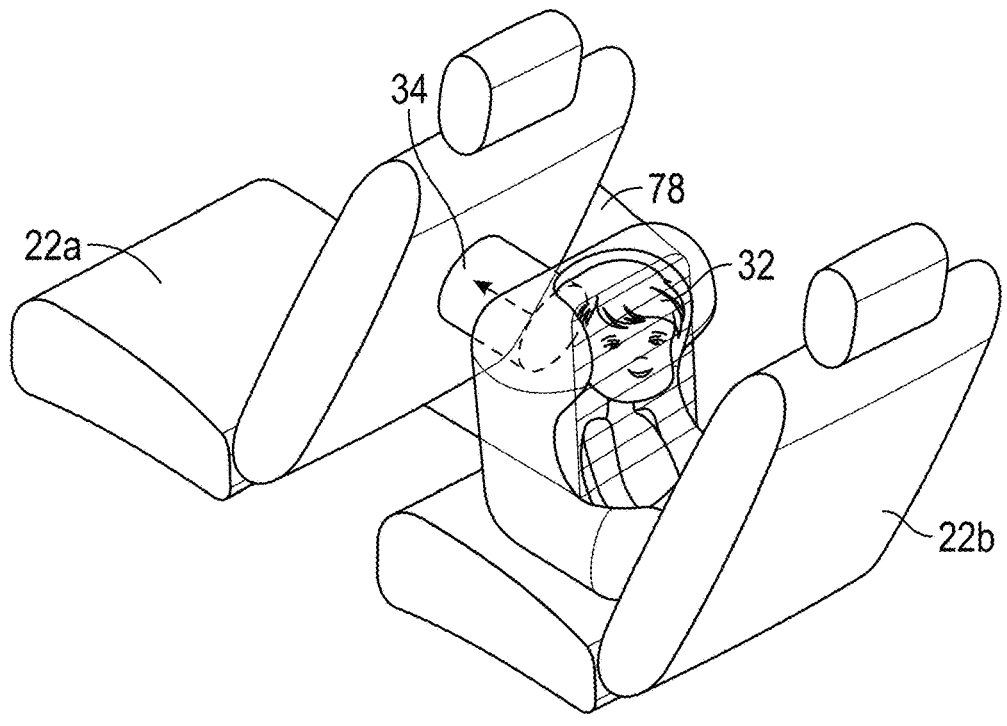
FIG. 13 is a schematic illustration of still another embodiment of an occupant compartment of a vehicle.

While the embodiments described above relate to rear passenger airbags 34 deployed from the seat back 36, in other embodiments the rear passenger airbag 34 may be deployed from other locations in the vehicle 10. For example, as illustrated in FIG. 10, in some embodiments the rear passenger airbag 34 may be deployed from a floor 72 of the vehicle 10. In other embodiments, such as in FIG. 11, the rear passenger airbag 34 may be deployed downwardly from a roof 74 of the vehicle 10. Other deployment locations of the rear passenger airbag 34 may include, for example, a body pillar 76 of the vehicle 10 as shown in FIG. 12, or a center console 78 of the vehicle 10, such as shown in FIG. 13. One skilled in the art will readily appreciate that these deployment locations of the rear passenger airbag 34 are merely exemplary, however, and that other deployment locations are contemplated within the scope of the present disclosure.

The rear passenger airbag 34 systems disclosed herein provide protection for rear seat passengers that is highly adaptable based on detected characteristics of the passenger, such as passenger size, passenger seating orientation, or passenger distance from the rear passenger airbag 34.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A safety system for an occupant of a vehicle, comprising:

an airbag selectably inflatable by an inflator operably connected to the airbag;

one or more deployment mechanisms operably connected to the airbag to control deployment of the airbag; and a controller operably connected to the one or more deployment mechanisms;

wherein the controller is configured to modify operation of the one or more deployment mechanisms as a result of detecting one or more characteristics of the occupant;

wherein the one or more deployment mechanisms includes one or more tethers having an adjustable tether length;

wherein adjusting the tether length modifies one or more of a shape, a size or a position of the airbag upon inflation of the airbag;

wherein the airbag is toroidal in shape; and wherein the one or more tethers extend in a circumferential direction along the toroidal shape of the airbag.

2. The safety system of claim 1, wherein the airbag is deployed from one of a seat back, a floor, a roof, a side pillar or a center console of the vehicle.

3. A vehicle, comprising:

a vehicle body defining an occupant compartment;

two or more rows of seats disposed in the occupant compartment, the two or more rows of seats including a first seat row and a second seat row; and a safety system for an occupant of a seat of the two or more rows of seats of the vehicle, including:

an airbag selectably inflatable by an inflator operably connected to the airbag;

one or more deployment mechanisms operably connected to the airbag to control deployment of the airbag; and a controller operably connected to the one or more deployment mechanisms;

wherein the controller is configured to modify operation of the one or more deployment mechanisms as a result of detecting one or more characteristics of the occupant;

wherein the one or more deployment mechanisms includes one or more tethers having an adjustable tether length;

wherein adjusting the tether length modifies one or more of a shape, a size or a position of the airbag upon inflation of the airbag;

wherein the airbag is toroidal in shape; and wherein the one or more tethers extend in a circumferential direction along the toroidal shape of the airbag.

4. The vehicle of claim 3, wherein the airbag is deployed from one of a seat back of the first seat row, a floor, a roof, a side pillar or a center console of the vehicle.

* * * * *